United States Patent [19]

Foster et al.

[11] 4,352,525
[45] Oct. 5, 1982

[54] WHEEL COVER WITH TORQUE RESISTOR

[75] Inventors: Edwin E. Foster; Thomas E. Foster, both of Austin, Tex.

[73] Assignee: Michael Ladney, Jr., Grosse Pointe Shores, Mich.

[21] Appl. No.: 261,463

[22] Filed: May 7, 1981

[51] Int. Cl.³ .............................................. B60B 7/06
[52] U.S. Cl. ............................. 301/37 PB; 301/37 P
[58] Field of Search ................ 301/37 R, 37 P, 37 B, 301/37 T, 37 TP, 37 PB, 37 C, 37 CD, 37 AT, 108 R, 108 A; 220/320; 292/256.6, 256.61, 256.65

[56] References Cited

U.S. PATENT DOCUMENTS

| | | | |
|---|---|---|---|
| 1,845,323 | 2/1932 | Neuner | 301/108 R |
| 3,480,329 | 11/1969 | Foster et al. | 301/37 R |
| 4,027,919 | 6/1977 | Foster et al. | 301/37 TP |

FOREIGN PATENT DOCUMENTS 1407140  9/1975  United Kingdom .............. 301/37 B

*Primary Examiner*—Charles A. Marmor
*Attorney, Agent, or Firm*—Barnes, Kisselle, Raisch & Choate

[57] ABSTRACT

A vehicle wheel cover releasably retained on a wheel by an annular resilient wire ring supported on the rear face of the cover. The ring has a plurality of radial outward projections thereon for releasably engaging the wheel rim. At at least one point around its circumference, the ring has radially outwardly bent parted ends which extend into a radial retaining passageway formed on the cover and which support therebetween a separate metal finger. The finger extends radially outwardly beyond the parted ends of the ring and has sharp pointed edges at its outer end which engage the wheel rim and prevent rotation of the cover relative to the wheel.

10 Claims, 5 Drawing Figures

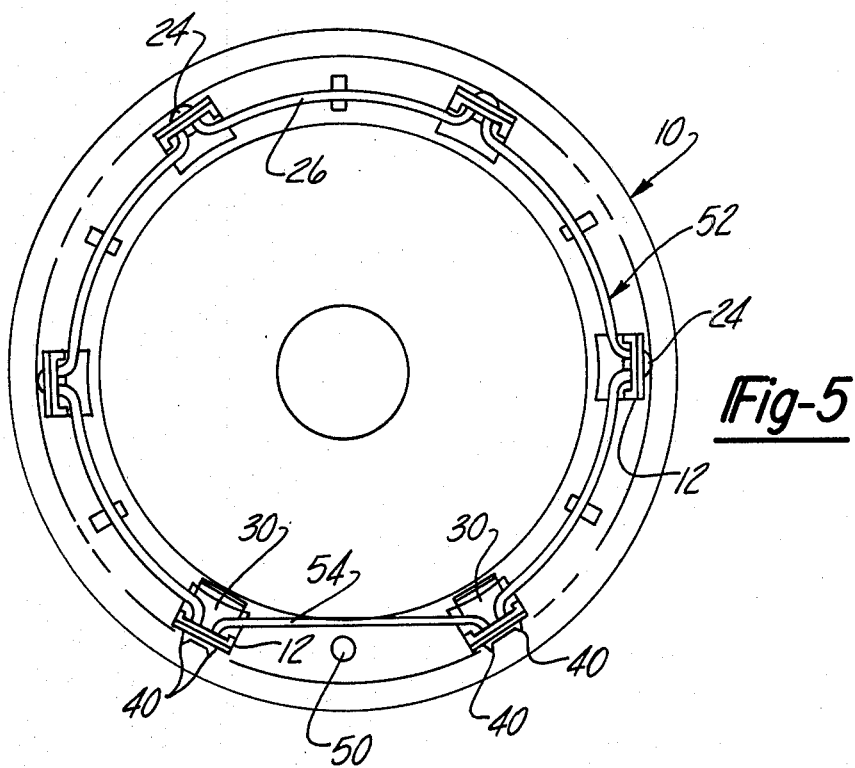

WHEEL COVER WITH TORQUE RESISTOR

This invention relates to a vehicle wheel cover, and, more particularly, to a means for retaining a wheel cover on a wheel in a manner which effectively resists rotation of the cover relative to the wheel.

In our prior U.S. Pat. No. 4,027,919 there is disclosed a wheel cover retention arrangement designed so that the forces for yieldably retaining the cover on the wheel are absorbed by the retention mechanism and are not transferred to the cover itself. This arrangement is particularly desirable where the wheel cover body is of light construction, such as plastic or thin sheet metal, which, if subjected to relatively large retention forces, are apt to distort.

In the arrangement disclosed in our prior patent the means for retaining the cover on the wheel comprises a resilient wire ring having a plurality of circumferentially spaced, and radially outwardly extending, projections thereon which are adapted to yieldably engage a wheel rim. The projections extend radially outwardly through passageways formed in lugs on the inboard face of the wheel cover. In several embodiments illustrated in our said prior patent the means for preventing the cover from rotating relative to the wheel consists of the ends of the radial projections which are formed with sharp points adapted to bite into the wheel rim when the cover is applied to the wheel. The extent to which these pointed ends of the projections can bite into the wheel and thus resist the torque applied to the cover by the wheel depends primarily upon the radial outward force that can be developed by the resilient wire ring. A relatively stiff ring will produce a greater radial outward force on the projections than a relatively flexible ring. However, the ring has to be sufficiently flexible so that it can be manually collapsed to an extent necessary to engage the radial projections within the radial passageways formed on the cover. On the other hand, the radial projections must be of sufficient radial extent to effectively engage wheel rims which vary in size within manufacturer's specifications. Thus, as a practical matter the stiffness of the ring has to be limited so that it can be manually assembled with the cover without the application of undue forces.

The primary object of the present invention is to provide a wheel cover of the type described constructed so that the resistance to rotation of the cover relative to the wheel can be substantially greater than is practical with the arrangement shown in our prior patent.

More specifically, it is an object of the present invention to provide a cover arrangement wherein the wire retainer ring may be formed of a relatively stiff spring wire to increase the torque resistance without unduly increasing the force required to assemble the ring to the wheel cover.

Another object of the invention is to provide a wheel cover of the type described wherein the torque resisting elements are formed as separate metal pieces held in place by the spring retainer ring.

Still another object of the present invention is to provide a wheel cover of the type described wherein at least some of the radial projections on the wire retainer ring are relatively short and are adapted to engage separate torque resistors which extend radially outwardly through the passageways in the cover to engage the wheel rim.

Other objects, features and advantages of the present invention will become apparent from the following description and accompanying drawing, in which:

FIG. 5 is a plan view of the inboard face of a modified wheel cover embodying the invention.

Figure 1:
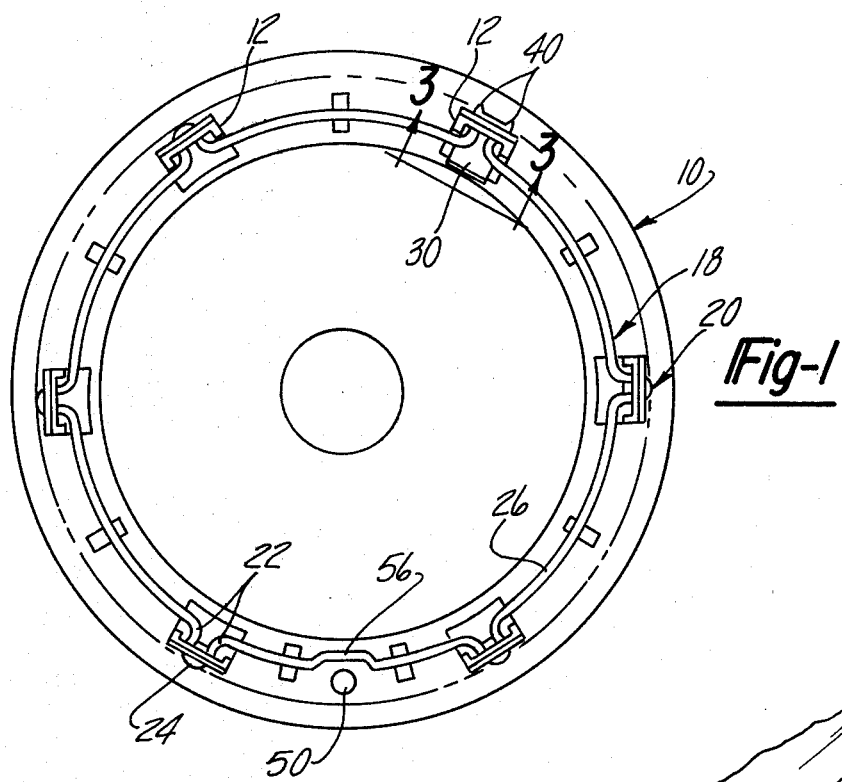
FIG. 1 is a plan view of the inboard face of the wheel cover according to the present invention.
Figure 2:
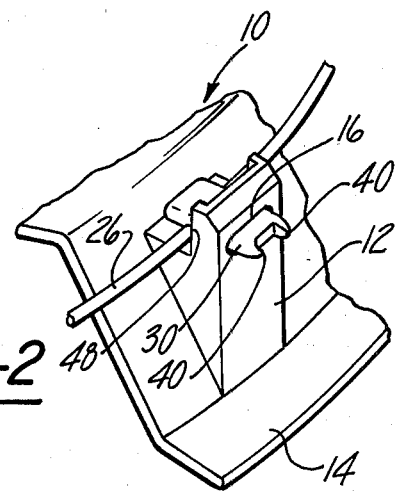
FIG. 2 is a fragmentary perspective view of a portion of the wheel cover shown in FIG. 1.

Referring to the drawings, there is illustrated in FIGS. 1 and 2 a plastic wheel cover 10 having a series of lugs 12 molded integrally therewith on the inboard face of the cover. In the arrangement shown six such lugs 12 are illustrated spaced equally around the circumference of the cover and located radially adjacent an outer peripheral flange 14 on the cover. Each of the lugs 12 is formed with a radially extending passageway 16 therein. A resilient wire ring 18 on the inboard face of the cover has a series of radial outward projections 20 which extend radially outwardly through the passageways 16 in the lugs 12. In the arrangement shown five of the projections 20 are formed integrally with the wire by bending it at circumferentially spaced points into U-shaped projections having a pair of generally parallel legs 22 connected by a return bent portion 24. The successive projections 20 are connected by circumferentially extending flexible portions 26 of the wire ring. Projections 20 are adapted to be displaced radially through passageways 16 for releasably engaging the wheel rim.

Figure 3:
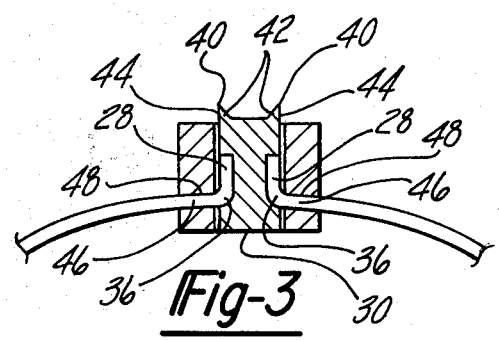
FIG. 3 is a fragmentary sectional view along the line 3—3 in FIG. 1.
Figure 4:
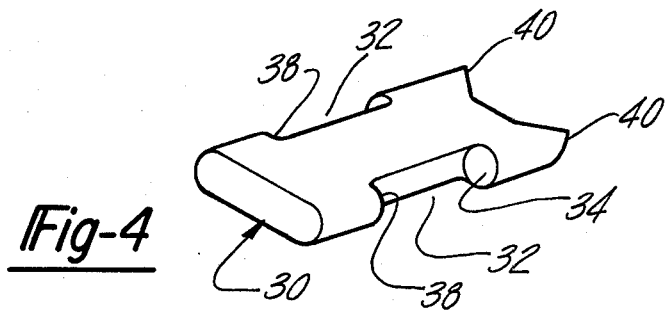
FIG. 4 is a perspective view of the torque resistor element of the present invention.

In the arrangement shown ring 18 has a pair of parted ends which are bent radially outwardly to form short radially extending legs 28 which are spaced apart circumferentially in parallel relation. The legs 28 extend radially a substantially lesser distance than the projections 20 and are held in spaced relation by a torque resisting finger 30. Finger 30 is dimensioned to have a close sliding fit in the radial passageway 16 of one of the lugs 12. On the opposite sides thereof and located approximately mid-way between its ends, finger 30 is fashioned with laterally inwardly extending recesses 32 which are dimensioned in length to correspond with the length of the legs 28. The width of the recesses 32 corresponds with the cross sectional dimension of the wire which forms the ring 18. Thus, when finger 30 is assembled with legs 28 of the wire ring in the manner illustrated in FIG. 3 the legs 28 are relatively closely embraced by the laterally outer portions of passageway 16 and by the finger 30. The outer ends of legs 28 are substantially in abutting relation with the shoulders 34 at the outer ends of recesses 32 and the right angle bends 36 at the inner ends of legs 28 are in substantialy abutting engagement with the rounded shoulders 38 adjacent the inner end of finger 30.

In the arrangement illustrated it will be observed that finger 30 is formed at its radially outer end with two sharp biting edges 40. The laterally inner opposed faces 42 which define the biting edges 40 are inclined radially outwardly in opposite directions and the laterally opposite outer faces 44 are generally parallel to each other and extend generally radially. Recesses 32 are located on finger 30 such that when the portions 46 of the ring 18 which are directly adjacent the bends 36 engage the shoulders 48 on lugs 16 the biting edges 40 extend radially outwardly to at least the circle defined by the radially outer ends of the projections 20.

In the arrangement illustrated in the drawing only one finger 30 with two oppositely disposed biting edges 40 is utilized. If desired, a plurality of such fingers 30 may be employed instead of one. Likewise, each finger 30 need not be formed with two biting edges 40; each finger 30 can be formed with a single biting edge such as shown at 40. It is important however that at least two biting edges 40 which face in circumferentially opposite directions are utilized to prevent rotation of the cover in opposite directions relative to the wheel.

In order to assemble the ring 18 with the cover it is first circumferentially contracted so that each of the projections 20 can be inserted radially outwardly through the passageways 16 in the lugs 12. The legs 28 of the wire ring are then engaged with the finger 30 in the manner illustrated in FIG. 3 and the circumferentially adjacent flexible portions 26 of the ring are flexed radially inwardly so that the legs 28 and the finger 30 can be directed radially outwardly through the passageway 16 in the remaining lug 12 on the inboard face of the wheel cover. When the ring is so assembled with the cover the outer ends of each of the projections 20 will all lie on approximately the same circle concentric with the center of the cover and the biting edges 40 on finger 30 will extend outwardly to at least the same circle.

The cover itself is applied to the wheel by placing the cover against the wheel with the valve stem on the wheel extending through the valve stem opening 50 on the cover. If the cover is inclined slightly to the plane of the wheel, the two projections 20 circumferentially adjacent the valve stem opening 50 on the cover will engage the inner periphery of the rim portion which the projections 20 are designed to engage. The cover can then be forced flatwise against the outer face of the wheel to engage the remaining projections 20 and the biting edges 40 of finger 30 with the annular surface on the rim which the projections 20 are designed to engage. When the cover is so applied to the wheel, the projections 20, as well as the finger 30, are displaced slightly radially inwardly so that when the cover is on the wheel each of the projections 20 and the finger 30 are biased in a radially outwardly direction by the outwardly bowed configuration of the intermediate flexible sections 26 of the ring.

The axially outer side of the annular surface of a wheel rim designed to be engaged by wheel cover retention members normally comprises a rounded shoulder which cams the projections 20 of ring 18 radially inwardly when the cover is applied to the wheel. This rounded shoulder coupled with the fact that the wire ring itself is of round cross section facilitates this radial inward displacement. It is preferred that at least the outer end portion of finger 30 be formed with rounded side edges adjacent the biting edges 40 so that the radial inward displacement of finger 30 is likewise unobstructed when the cover is pressed flat against the outer face of the vehicle wheel. However, if the finger 30 is located within a lug 12 directly adjacent the valve stem opening 50 in the cover, then the outer side edges of finger 30 can be flat rather than rounded since the biting edges 40 can be initially located substantially directly on the annular surface of the ring designed to be engaged by the projections 20 when the cover is inclined slightly to the plane of the wheel.

It will be appreciated that with the arrangement shown, if ring 18 is assembled with the wheel cover so that each of the projections 20 are engaged in the passageways 16 of the lugs 12 prior to the engagement of the finger 30 with its respective lug, then the sections 26 of the ring adjacent the legs 28 have to be flexed radially inwardly a relatively short extent to fully engage the finger 30 with its lug 12. This results from the fact that the finger 30 can be partially inserted through the passageway 16 before the legs 28 of the ring are engaged therewith. After the finger 30 is partially inserted through its passageway 16 the parted ends 28 of the ring can be engaged with the recesses 32 on finger 30 and then the finger 30 can be permitted to shift radially outwardly to the fully engaged position where the ring engages the shoulders 48 on lug 12. In this position at least the radially outer end portions of the legs 28 are enclosed within the passageway 16 and are retained in assembled relation with the cover and finger 30 by the inherent resiliency of the ring. Ring 18 can therefore be fabricated from a relatively stiff spring wire since the portions of the ring adjacent the legs 28 have to be flexed radially inwardly a substantially lesser extent than if the biting ends 40 were formed directly on the parted ends 28 of the wire ring in order to engage the projections formed by the finger 30 within the passageway 16 of its respective lug 12. It will also be appreciated that finger 30 can be formed from hardened steel so that the biting edges 40 can withstand the wear to which they may be subjected.

In the modified form of wheel cover shown in FIG. 5 the ring 52 has a shorter circumferential extent than the ring 18 shown in FIG. 1 and two fingers 30 are employed rather than a single finger. The two fingers 30 are located on opposite sides of the valve stem opening 50 on the cover. The two fingers 30 are interconnected by a separate short, circumferentially extending, flexible wire portion 54. In other respects the arrangement shown in FIG. 5 is substantially the same as shown in FIG. 1 from the standpoint of construction, function and operation.

Under some circumstances the construction shown in FIG. 5 is preferred over that shown in FIG. 1. In the arrangement shown in FIG. 5 ring 52 can be produced on an automatic wire forming machine with the four projections 20 spaced equally apart circumferentially. The separate circumferentially extending wire portion 54 can be separately formed to any desired length and need not have the offset portion 56 (FIG. 1) to avoid interference with the valve stem on the vehicle wheel. Alternatively, with the arrangement shown in FIG. 5 the wire ring 52 could be initially formed with six equally spaced projections 20 and, thereafter, the bite portions of two circumferentially adjacent projections could be sheared off to form the legs 28 at the opposite ends of the ring for interengagement with the two fingers 30.

We claim:

1. In a cover for a vehicle wheel of the type having a body and a resilient wire ring member mounted on the inboard face of the cover body, said ring member having at least one pair of parted ends and a plurality of radially outward projections thereon extending through radial passageways on the cover which are adapted to releasably engage an annular surface on the wheel rim to retain the cover on the wheel, that improvement which comprises, at least one of said projections being formed as a metal member separate from the ring member and extending radially outwardly through one of said passageways, said parted ends of the ring being bent radially outwardly to form a pair of radially outwardly extending legs, the laterally opposite sides of said metal member having laterally inwardly extending recesses therein, said legs being nested within said recesses, said metal member having a radially outwardly projecting biting edge at its radially outer end adapted, when the cover is mounted on the wheel, to dig into said annular surface of the wheel rim to resist rotation of the cover relative to the wheel.

2. A cover as called for in claim 1 wherein said legs are spaced apart circumferentially in generally parallel relation.

3. A cover as called for in claim 1 wherein the radially outer ends of said legs terminate at their outer ends radially inwardly of said biting edges.

4. A cover as called for in claim 3 wherein said metal member extends radially inwardly beyond the inner ends of said legs.

5. A cover as called for in claim 1 wherein the width of said recesses in a circumferential direction corresponds generally with the cross sectional dimension of said wire.

6. A cover as called for in claim 1 wherein said recesses have a radial extent corresponding generally to the radial extent of said outwardly bent legs.

7. A cover as called for in claim 1 wherein the radial extent of said outwardly bent legs is determined such that the radially outer ends of said legs terminate within said radial passageways.

8. A cover as called for in claim 1 wherein the inboard face of the cover is formed with an axially inwardly extending lug, said one passageway being formed in said lug, said lug having circumferentially extending shoulders adjacent the radially inner end of the passageway therein, the portions of said ring member directly adjacent said radially outwardly bent legs being adapted to abut radially against said shoulders to limit the radial displacement of said legs and said metal member.

9. A cover as called for in claim 1 wherein the ring member has at least two pair of parted ends and at least two circumferentially adjacent projections formed as said metal members, said ring member comprising a first wire section extending circumferentially between said two metal members around a major portion of the cover body and a substantially shorter second wire section extending circumferentially between the ends of the first wire section, the opposite ends of the first wire section cooperating with the opposite ends of the second wire section to define said two pair of parted ends.

10. A cover as called for in claim 9 wherein the cover is provided with an opening adjacent its periphery to accommodate a valve stem on the vehicle wheel, said two metal members being spaced on opposite sides of said valve stem opening and said shorter second wire section being disposed radially adjacent the valve stem opening.

* * * * *